United States Patent [19]
Kondo et al.

[11] 3,873,331
[45] Mar. 25, 1975

[54] PROCESS FOR FLUID CALCINING CEMENT RAW MEAL

[75] Inventors: Marekata Kondo, Yono; Seiwa Fukuda, Kawagoe; Toyohiko Yamamoto, Omiya, all of Japan

[73] Assignee: Mitsubishi Mining & Cement Company, Ltd., Tokyo, Japan

[22] Filed: Aug. 22, 1973

[21] Appl. No.: 390,401

[30] Foreign Application Priority Data
Aug. 31, 1972 Japan................................ 47-86612

[52] U.S. Cl..................................... 106/100, 432/15
[51] Int. Cl................................................ C04b 7/36
[58] Field of Search........................ 106/100; 432/15

[56] References Cited
UNITED STATES PATENTS

| | | | |
|---|---|---|---|
| 2,409,707 | 10/1946 | Roetheli | 106/100 |
| 2,776,132 | 1/1957 | Pyzel | 106/100 |
| 2,981,531 | 4/1961 | Pyzel | 106/100 |
| 3,022,989 | 2/1962 | Pyzel | 106/100 |

*Primary Examiner*—J. Poer
*Attorney, Agent, or Firm*—Edward J. Brenner

[57] ABSTRACT

A new process for fluid calcining cement raw meal using a fluidized furnace equipped between a rotary kiln and a suspension preheater and having a separate heat source is provided. This process comprises dividing an air stream to be fed into the fluidized furnace into two parts and introducing one part thereof into a fluidized bed of the fluidized furnace and the other part thereof into a space above the fluidized bed for the purpose of increasing a calcining capacity of the fluidized furnace and at the same time reducing a running cost thereof remarkably.

1 Claim, 2 Drawing Figures

PROCESS FOR FLUID CALCINING CEMENT RAW MEAL

BACKGROUND OF THE INVENTION

This invention relates to a process for fluid calcining cement raw meal which uses a fluidized furnace equipped between a rotary kiln and a suspension preheater and having a separate heat source comprising dividing a part of an air stream to be fed into the fluidized furnace and introducing it into a space above a fluidized bed of the furnace for the purpose of increasing a calcining capacity of the fluidized furnace and reducing a running cost thereof remarkably.

A process for burning cement clinker (Japanese Pat. Publication No. 30058/1968) comprising a fluidized furnace as a calciner (said fluidized furnace is referred to hereinafter as a fluidized calciner) equipped between a rotary kiln and a suspension preheater and having a separate heat source is, as is generally known, an invention which solves problems including a short life of refractory materials due to the increased heat load of the rotary kiln caused inevitably by making a cement clinker burning equippment large-sized, thereby making a specific capacity of the rotary kiln (a production capacity per unit volume thereof) remarkably increased and enabling a stable operation thereof. In the conventional fluidized calciner as described hereinabove, however, it is well-known theoretically and empirically that in the case in which as a combustion mechanism mainly a combustion in the fluidized bed is considered, it is necessary to keep the height of the fluidized bed high so as to have a heat load increased. Further, air fed into said fluidized bed is air for fluidizing and at the same time air for combustion of fuels. As there is a limitation on the amount of the air for fluidizing, the amount of a burnable fuel supplied, that is, a heat load which said fluifized calciner can bear is spontaneously limited.

As is generally known, in order to operate a fluidized furnace economically, it is desirable to reduce a running cost thereof by keeping the height of a fluidized bed as low as possible to make a pressure loss of the fluidized bed decreased and at the same time make the equippment small-sized or a treatment capacity thereof increased by increasing the heat load.

This invention has been devised to overcome the defects of the conventional fluidized calciner as described hereinabove.

SUMMARY OF THE INVENTION

A primary object of this invention is to provide a process for fluid calcining cement raw meal which makes a heat load of a fluidized calciner increased, thereby enabling an increase in calcining capacity thereof.

Another object of this invention is to provide a process for fluid calcining cement raw meal which makes a pressure loss due to a fluidized bed decreased, thereby enabling a reduction of running cost of the fluidized calciner.

A further object of this invention is to provide a process for fluid calcining cement raw meal which prevents the generation of coating trouble in the fluidized calciner, thereby enabling a stable operation thereof.

According to this invention, there is provided a process for fluid calcining cement raw meal using a fluidized furnace equipped between a rotary kiln and a suspension preheater and having a separate heat source, comprising dividing an air stream to be introduced into said fluidized furnace into two parts and introducing one part thereof into a fluidized bed of said furnace and the other part thereof into a space above said fluidized bed.

The features of this invention reside in that an air stream to be fed into a fluidized furnace is divided into two parts, one part thereof being introduced into a lowered fluidized bed of said furnace and another part thereof being introduced into a space above the fluidized bed to carry out positively a combustion in said space, thereby enabling a reduction of an all-over power comsumption for air forced feeding and an increase of a heat load.

These and other objects of this invention will be readily appreciated by reference to the following detailed description when considered in connection with the accompanying drawing.

DETAILED DESCRIPTION OF THE INVENTION

This invention comprises burning only the part of the fuel fed into the fluidized bed which is burnable in said bed, cracking at the same time the whole remaining part of the fuel in said bed, burning rapidly and uniformly the fuel gas generated by said cracking in the space above the fluidized bed with the air stream divided introduced into said space so as to have the cement raw meal floating uniformly and in high concentration in said space effectively calcined.

Figure 2:
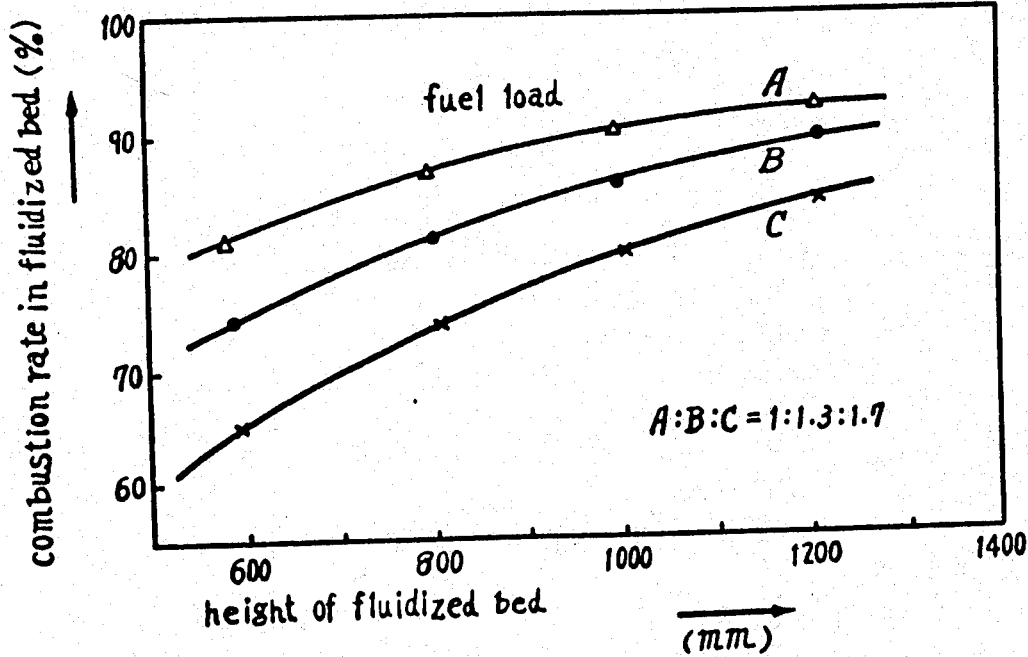
FIG. 2 is a graph showing a relation between a height of the fluidized bed plotted as abscissa and a combustion rate in the fluidized bed plotted as ordinate at various fuel loads.

According to the relation between a height of the fluidized bed and a combustion rate in the fluidized bed at various fuel loads (FIG. 2) obtained in the research process of this invention, it was confirmed that although it is required to increase the height of the fluidized bed so as to have the combustion rate in said bed improved, increasingly blindly the height of the fluidized bed is not preferable from an operational point of view because the pressure loss of the fluidized bed becomes extensive and the combustion rate is not so improved for the increased height of the fluidized bed. Especially in the case in which cement raw meal is calcined by means of the fluidized bed, such a process comprising burning only the part of the fuel fed into the fluidized bed which is burnable in said bed therein, cracking the whole remaining part of said fuel in said bed and carrying out positively a combustion above said bed as this invention was confirmed to be more favorable than a process which is mainly based on a combustion in the fluidized bed having a increased height for the reason that a heat load per unit sectional area of the fluidized furnace can be increased more than the combustion capacity in the fluidized bed and/or in all-over power consumption for air feed can be decreased by introducing a combustion air divided into the space above the fluidized bed having a pressure as low as the atmospheric pressure and simultaneously making the height of the fluidized bed as low as possible so far as a stable fluidized state can be kept.

The reason that such a combustion above the fluidized bed as described hereinafter is safely possible especially in the case in which cement raw meal is calcined was confirmed by the operation research as follows.

First, in the method for burning fuels according to this invention, in which a fluidized bed is utilized as a cracking means for the remaining part of the fuel which uses caloric power of the fuel burned in said bed as a heat source, a dispersion of the fuel gasified by said cracking into the space above the fluidized bed is ideally uniform and a fuel density in said space becomes small, such a local high temperature flame as seen in a space combustion by means of an ordinary burner is not formed. Therefore, there is generated no coating trouble due to an adhesion of low melting temperature components of the raw meal to the inner parts the fluidized calciner. In this case, a cracking capacity of the fuel per unit volume of the fluidized bed is almost unequivocally determined by the temperature of the fluidized bed, and said temperature can be easily kept within the sufficiently safe range by controlling a combustion rate in the fluidized bed of the fuel fed, that is, the height of the fluidized bed. In this case, it is possible to set up the temperature of the fluidized bed independently of the decarbonization temperature of the raw meal and it is also possible to operate under the condition in which the temperature of the fluidized bed is lower than the decarbonization equilibrium temperature.

Secondly, about 70 percent of the raw meal calcined which is dispersed into the space above the fluidized bed uniformly and in high concentration by the fluidized bed, comprises carbonate salts, and these decarbonization reactions proceed at about 800°~850°C, accompanying a great deal of heat absorption of about 510kcal/kg clinker including dehydration heat of kaoline. Furthermore, as these decarbonization reactions proceed very rapidly at the temperature range above mentioned, the combustion heat of the fuel burned in the space above the fluidized bed is immediately supplied to these decarbonization reactions, therefore the temperature of the fluidized calciner waste gas becomes 850°~900°C slightly higher than the decarbonization temperature, thereby making the raw meal very effectively calcined. And the temperature of the atmosphere in the space above the fluidized bed can be kept at sufficiently low level against coating troubles due to an adhesion of the raw meal melted.

The effect of this invention is that a heat load per unit sectional area of the fluidized bed can be increased in proportion to the amount of air introduced into the space above the fluidized bed and owing to such a low pressure in the space above the fluidized bed as an atmospheric pressure the air stream divided can be blown into said space even by a low pressure fan, therefore an all-over air pressure can be decreased remarkably, as compared with the conventional process, even though the fluidized calciner is operated at the same pressure loss of the fluidized bed as that of the conventional process.

This invention will now be illustrated by the following example. Of course, this invention shall not be limited to the following example.

EXAMPLE

Figure 1:
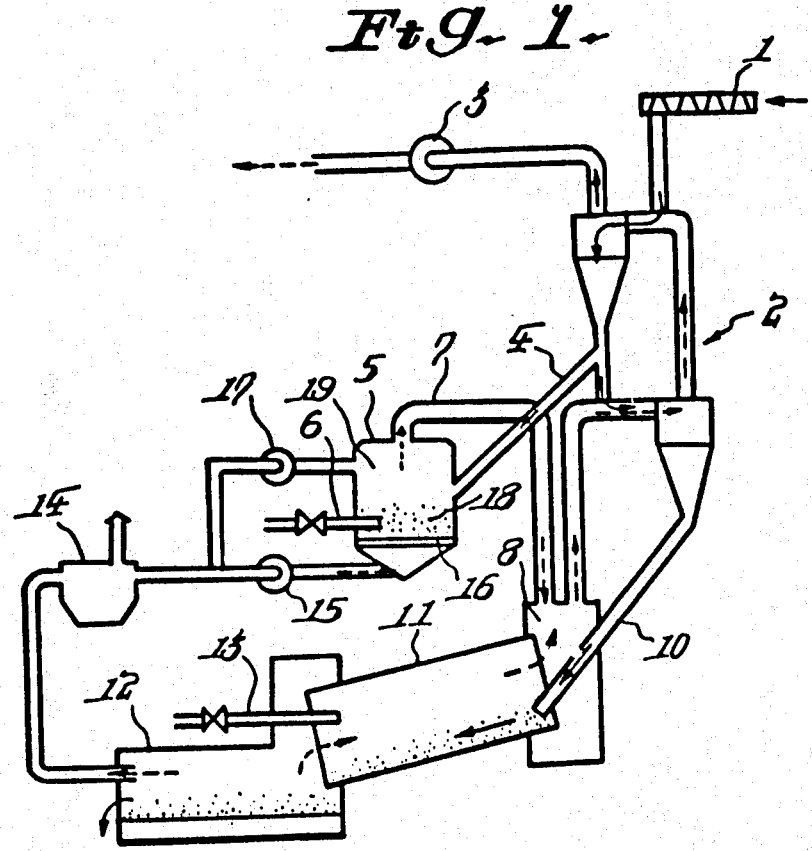
FIG. 1 is an arrangement drawing of a cement clinker burning equippment with a fluidized calciner equipped between a rotary kiln and a suspension preheater and having a separate heat source used for carrying out a preferred embodiment of this invention.

FIG. 1 is an arrangement drawing of a cement clinker burning equippment with a fluidized calciner equipped between a rotary kiln and a suspension preheater and having a separated heat source used for carrying out this Example. This fluidized calciner comprises introducing an air stream divided into a space above a fluidized bed so as to have a combustion above the fluidized bed carried out positively.

In FIG. 1, 1 is a raw meal feeder, 2 a suspension preheater, 3 an induced draft fan, 4 a raw meal chute for a fluidized calciner, 5 a fluidized calciner, 6 burners for a fluidized calciner, 7 a waste gas duct of a fluidized calciner, 8 a smoke chamber of a rotary kiln, 9 a rotary kiln waste gas duct, 10 a raw material chute, 11 a rotary kiln, 12 a clinker cooler, 13 a rotary kiln burner, 14 a dust collector for a clinker cooler waste gas, 15 a fluidization blower, 16 a fluidizing unit, 17 a fan for a divided air stream, 18 a fluidized bed, and 19 a space above a fluidized bed.

A part or a whole quantity of the raw meal already partially calcined by heat-exchange with the hot gas in the preheater 2 is extracted from a suitable place, for example, from a raw material outlet of a cyclone, just above the lowest stage cyclone of the preheater 2 to be introduced through the raw meal chute 4 into the fluidized calciner 5. In this Example, the fluidized bed is composed of a fluidizing medium and a raw meal to be calcined, a particle size distribution of the former being not overlapped with that of the latter, and a method of discharging the raw meal from the fluidized calciner is a carry over system in which the whole quantity of the raw meal calcined is accompanied by the fluidized calciner wste gas.

The extracted gas or waste gas of 150°~350°C from the clinker cooler 12 is treated by the dust collector 14 and then is divided into two parts, a part thereof being introduced through the fluidizing unit 16 into the fluidized bed 18 by means of the blower 15 so as to have fluidizing medium vigorously fluidized. This waste gas substantially comprising air takes part in a combustion of a part of the fuel fed by the burners 6, and at the same time disperses the raw meal in the fluidized bed, after its residence therein for a certain time, into the space 19 above the fluidized bed 18. On the other hand, as another part of said clinker cooler waste gas divided is blown into the space 19 above the fluidized bed 18 through one inlet or plural ones almost tangentially by the fan 17, a fuel gas generated by cracking of the fuel in the fluidized bed is uniformly and rapidly burned in the space 19 above the fluidized bed 18. As the dispersion of the raw meal is very good and the fuel is cracked uniformly in the whole fluidized bed, there occurs neither local overheating due to local flames, nor coating trouble due to an adhesion of low melting components of the raw meal.

The whole quantity of the raw meal calcined accompanied by the fluidized calciner waste gas is entered through the duct 7 into the smoke chamber 8 to be mixed with the rotary kiln waste gas therein, then is introduced through the duct 9 into the lowest stage cyclone of the preheater 2, and if required, with the remaining part of the raw meal not introduced into the fluidized calciner 5, to be calcined therein by the high temperature rotary kiln waste gas and then collected by said cyclone, and is finally introduced through the raw meal shute 10 into the rotary kiln 11 to be burned to cement clinker by the rotary kiln burner 13.

A comparison between the results of the operation of this invention process and those of the conventional process is shown in the following table.

| | height of fluidized bed mm | fuel load ratio % | calcining temperature °C | air above fluidized bed ratio % | power consumption for air forced feeding kwH/t clinker | decarbonization rate % inlet | decarbonization rate % outlet | treatment capacity ratio % |
|---|---|---|---|---|---|---|---|---|
| I | 1200 | 170 | 850 | 40 | 1.2 | 8.1 | 87.7 | 162 |
| II | 600 | 152 | 850 | 55 | 1.0 | 8.1 | 86.8 | 142 |
| III | 120 | 100 | 850 | 0 | 2.5 | 8.2 | 89.2 | 100 | notes: (1) I, II — this invention process
III — the conventional process
(2) fuel load ratio and treatment capacity are regarded as 100% in the conventional process The case I is a case of this invention process in which the height of the fluidized bed is the same as that of the case III of the conventional process. In the case I, the increase in the fuel load due to the combustion above the fluidized bed is about 70 percent and the decrease in the all-over power consumption for air forced feeding due to the increase of the treatment capacity is about 50 percent, as compared with the case III. The case II is a case of this invention process in which the height of the fluidized bed is half of that of the case III. In the case II, the increase in the fuel load is about 52 percent and the decrease in the all-over power consumption for air forced feeding due to both the lowered height of the fluidized bed and the increased ratio of the low pressure air above the fluidized bed is about 60 percent. Furthermore, it was confirmed that in each of the cases I and II, the decarbonization rate of the raw meal is kept at almost the same level as that of the conventional process and consequently a effective calcining thereof is carried out, therefore this invention is industrially of great value.

What is claimed is:

1. In a process for fluid calcining cement raw meal using a separate heat source combined with a suspension preheating type cement clinker burning process, the improvement comprising
regulating the height of a fluidized bed as low as possible while maintaining said bed in a stabilized state, said bed consisting mainly of a fluidizing medium and cement raw meal and the particle size distribution of said fluidizing medium being not overlapped with that of said cement raw meal,
dividing an air stream into two parts,
introducing one part of said air stream into said fluidized bed so as to burn fuel charged thereinto and to gasify the remainder of said fuel therein with heat generated by said burning of the fuel, and
introducing the other part of said air stream into a space above said fluidized bed so as to burn said gasified fuel dispersing uniformly in diluted concentration in said space for calcining said cement raw meal floating in dense concentration therein.

* * * * *